(12) United States Patent
Lee et al.

(10) Patent No.: US 6,816,447 B1
(45) Date of Patent: Nov. 9, 2004

(54) CREATION OF SYNCHRONIZATION MARKS IN MULTILEVEL OPTICAL DATA STORAGE

(75) Inventors: David C. Lee, Alameda, CA (US); Steven R. Spielman, Alameda, CA (US); Jonathan A. Zingman, Alameda, CA (US); Gregory S. Lewis, Alameda, CA (US)

(73) Assignee: LSI Logic Corporation, Milpitas, CA (US)

( * ) Notice: Subject to any disclaimer, the term of this patent is extended or adjusted under 35 U.S.C. 154(b) by 498 days.

(21) Appl. No.: 09/872,486

(22) Filed: May 31, 2001

(51) Int. Cl.[7] .................................................. G11B 7/00
(52) U.S. Cl. ................... 369/59.19; 369/47.28; 369/59.25; 369/59.24; 369/47.35
(58) Field of Search ................... 369/59.19, 275.3, 369/47.28, 59.25, 59.24, 59.23, 47.48, 47.35, 109.02

(56) References Cited

U.S. PATENT DOCUMENTS

| | | | | |
|---|---|---|---|---|
| 5,031,168 A | * | 7/1991 | Moore | 369/59.25 |
| 5,392,289 A | * | 2/1995 | Varian | 714/707 |
| 5,598,429 A | * | 1/1997 | Marshall | 375/149 |
| 5,768,234 A | * | 6/1998 | Satomura | 369/59.19 |
| 5,818,806 A | * | 10/1998 | Wong et al. | 369/53.33 |
| 5,854,779 A | * | 12/1998 | Johnson et al. | 369/59.18 |
| 5,949,817 A | * | 9/1999 | Marshall | 375/142 |
| 6,148,428 A | * | 11/2000 | Welch et al. | 714/752 |
| 6,275,458 B1 | * | 8/2001 | Wong et al. | 369/47.19 |
| 6,608,807 B1 | * | 8/2003 | Lee | 369/59.26 |

* cited by examiner

*Primary Examiner*—Hoa T. Nguyen
*Assistant Examiner*—Peter Vincent Agustin
(74) *Attorney, Agent, or Firm*—Sawyer Law Group (57) ABSTRACT

Creation and detection of synchronization marks for a multilevel data storage medium is disclosed. A sequence of symbols is generated and the sequence of symbols is written to the multilevel data storage medium. A corresponding sequence may be generated by a detector and correlated with read data to detect the synchronization mark.

11 Claims, 9 Drawing Sheets

FIG.1A

[Synchronization Field] [Data Sector Field] [Sync Field] [Data Sector Field]...

CREATION OF SYNCHRONIZATION MARKS IN MULTILEVEL OPTICAL DATA STORAGE

BACKGROUND OF THE INVENTION

1. Field of the Invention

The present invention relates generally to optical data storage. In particular, synchronizing data sectors in a multilevel optical data storage system is disclosed.

2. Relationship to the Art

In order to increase the capacity and speed of optical data storage systems, multilevel optical data storage systems have been developed. Note that in this specification, the term "multilevel" refers to more than two levels. In a traditional optical data storage system, reflectivity of the recording medium is modulated between two states. The density of data recorded on an optical recording medium can be increased by modulating the reflectivity of the optical recording medium into more than two states.

Binary optical data storage systems employ special synchronization patterns at various locations within each sector of data to determine the correct alignment for decoding data. One can choose synchronization patterns that violate some constraint of the underlying code so that they cannot appear as part of normal data. This minimizes the number of false detections of synchronization sequences. For example, in a system with a (d, k) run-length limit (RLL) binary code, at least d, and at most k, zero channel bits must appear between each pair of one channel bits. Thus one can use a synchronization pattern with a run of k+1 zero channel bits between a pair of one channel bits.

Alternatively, one can use an unusual synchronization pattern and some special procedures to guarantee that the data never contains the synchronization pattern. In a CD optical data storage system, data is encoded with eight-fourteen modulation (EFM) code, which is a (2,10) RLL code that encodes each data byte (eight bits) into a 14-bit codeword. The CD system writes the synchronization pattern {10000000000100000000010} at the start of each frame of data. This synchronization pattern contains two adjacent runs of 10 zero bits between pairs of one bits, making it distinct and easy for the CD reader to locate within a frame of data. Although it is unusual, it still obeys the run-length limits of the EFM code and hence could occur within a frame of random data. However, when encoding the user data, the CD system adds three merge bits in front of each 14-bit codeword in order to maintain RLL across pairs of codewords and to apply DC control. The three merge bits are chosen so that the synchronization pattern can never appear in the data sequence.

Since binary optical data storage systems use RLL codes, they can use simple synchronization patterns that violate the RLL constraints (usually the upper RLL). However, in a multilevel system that uses a code with an upper RLL, because of the finer spacing of levels, a synchronization pattern that violates the RLL constraint might be difficult to distinguish from a valid data sequence of the same length that contains a small transition between two short runs. For example, if there are eight levels (0 to 7) in the system and the upper RLL is 10 symbols, then the synchronization pattern {7000000000007} is very similar to {7000001000007}, whereas the equivalent binary case {7000007000007} of two short runs combined together is much more distinct.

Moreover, a multilevel system may not even use a code with an upper RLL. A multilevel system may use a trellis or MSN code (see, for example, copending U.S. patent application Ser. No. 09/369,746, entitled "Coding System And Method For Partial Response Channels" filed Aug. 6, 1999 which is herein incorporated by reference, which is much more complex than a RLL code and may or may not have an upper run-length limit. Because of the complexity of trellis and MSN codes, it may not be straightforward to create a short synchronization pattern that is very distinct from every valid data sequence of the same length. A long synchronization pattern will result in a complex synchronization detector. In addition, a synchronization pattern for one code probably will not be a good choice of synchronization pattern for other codes.

In view of the foregoing, there is a need for methods for synchronizing data in a multilevel optical data storage system that can be used with a wide variety of codes, that do not depend on the code having an upper RLL, and that are computationally simple.

SUMMARY OF THE INVENTION

Accordingly, a system and method for providing synchronization in multilevel optical data storage systems is disclosed. It is computationally efficient and useful for a wide variety of codes. On the write side, the system inserts a synchronization pattern at the start or at various locations within a sector of data. On the read side, the system uses a synchronization detector to detect the synchronization pattern.

The synchronization pattern can be a pseudo-noise (PN) sequence with one or more marks per PN chip to compensate for blurring effects of intersymbol interference during writing and reading. On the read side, the A/D converter may sample one or more times per mark. The synchronization detector precisely locates the synchronization pattern within the sampled read signal by slicing the signal and correlating it with a modified version of the PN sequence. If a system uses a two-dimensional cross constellation to modulate user data, then the synchronization pattern can include invalid pairs of symbols. The synchronization detector can be a simple correlation detector or comparator. If a system uses a DC control (DCC) encoder, then the synchronization pattern can be any unusual or distinct sequence of symbols, including those mentioned above. The DCC encoder, which chooses merge symbols from a plurality of candidate merge symbols to interlace with blocks of user data in order to provide DC balance, can eliminate candidate merge symbols that would result in the synchronization pattern appearing within the data stream. Finally, if the system uses a timing-recovery circuit that has distinct acquisition and tracking stages, then the synchronization pattern can mark the transition from acquisition to tracking.

It should be appreciated that the present invention can be implemented in numerous ways, including as a process, an apparatus, a system, a device, a method, or a computer-readable medium that includes certain types of marks that enable reliable data storage and recovery. Several inventive embodiments of the present invention are described below.

In one embodiment, a synchronization mark is created on a multilevel data storage medium. Creating the mark includes generating a pseudo-noise sequence having a plurality of bits; converting each 0 bit of the pseudo-noise sequence to the lowest symbol that is written to the multilevel data storage medium; converting each 1 bit of the pseudo-noise sequence to the highest symbol that is written to the multilevel data storage medium; deriving a resulting sequence of symbols from the converted bits; and writing the resulting sequence of symbols to the multilevel data storage medium.

In one embodiment, a synchronization mark on a multilevel data storage medium is detected by generating a pseudo-noise sequence having a plurality of bits; converting the pseudo-noise sequence to an expected synchronization sequence that would result from reading a synchronization mark generated using the pseudo-noise sequence; correlating the expected synchronization sequence with a read sequence from the data storage medium to produce a correlation sequence of correlation sums; and detecting the peak value of the sequence of correlation sums.

In one embodiment, a synchronization mark on a multilevel data storage medium is created. Creating the mark includes generating a data sequence to be written to the multilevel data storage medium using a two dimensional cross constellation having a plurality of invalid symbol pairs; generating a synchronization sequence of symbols that includes a combination of the invalid symbol pairs; and writing the synchronization sequence to the multilevel data storage medium.

In one embodiment, a synchronization mark on a multilevel data storage medium is created. Creating the mark includes defining a synchronization sequence; generating a data sequence to be written to the multilevel data storage medium; dividing the data sequence into a series of data blocks having merge symbols inserted between the data blocks so that the resulting sequence does not include the synchronization sequence; and writing the synchronization sequence to the multilevel data storage medium.

In one embodiment, a synchronization detector for detecting a synchronization mark written to a multilevel data storage medium includes a pseudo-noise sequence generator for generating a pseudo-noise sequence having a plurality of bits; a processor configured to convert the pseudo-noise sequence to an expected synchronization sequence that would result from reading a synchronization mark generated using the pseudo-noise sequence; a correlator configured to correlate the expected synchronization sequence with a read sequence from the data storage medium to produce a correlation sequence of correlation sums; and a peak detector configured to detect the peak value of the sequence of correlation sums.

In one embodiment, a data writing system for writing data to a multilevel data storage medium includes a pseudo-noise sequence generator for generating a pseudo-noise sequence having a plurality of bits; a processor configured to convert each 0 bit of the pseudo-noise sequence to the lowest symbol that is written to the multilevel data storage medium and to convert each 1 bit of the pseudo-noise sequence to the highest symbol that is written to the multilevel data storage medium; and a multiplexer configured to mix the resulting sequence of converted symbols with data from a data source.

In one embodiment, a multilevel optical storage disc includes multilevel marks that encode data; and synchronization marks determined by: generating a pseudo-noise sequence having a plurality of bits; converting each 0 bit of the pseudo-noise sequence to the lowest symbol that is written to the multilevel data storage medium; converting each 1 bit of the pseudo-noise sequence to the highest symbol that is written to the multilevel data storage medium; and deriving a resulting sequence of symbols from the converted bits.

These and other features and advantages of the present invention will be presented in more detail in the following specification of the invention and the accompanying figures which illustrate by way of example the principles of the invention.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In one embodiment, synchronization is provided using a pseudo-noise (PN) sequence. A PN sequence has pseudo-random properties that make it easy to identify when embedded within a data stream encoded by any of a wide variety of codes. Although a PN sequence may turn out to be close to or identical to a valid data sequence for a given code, the frequency of such false alarms should be acceptably low for a long enough PN sequence. A synchronization detector for such a long PN sequence may, however, be too complex. Another problem to be addressed is that, at high data densities, the optical read signal may contain significant intersymbol interference that smoothes out the peaks and troughs in the PN sequence. When the PN sequence detector correlates the sample stream from the optical read signal with the PN sequence, the correlation peak may be flat, resulting in detection of the PN sequence of one or more samples before or after its actual occurrence. This will cause corresponding misalignment of the data stream in subsequent detection and decoding sectors.

Figure 1A:
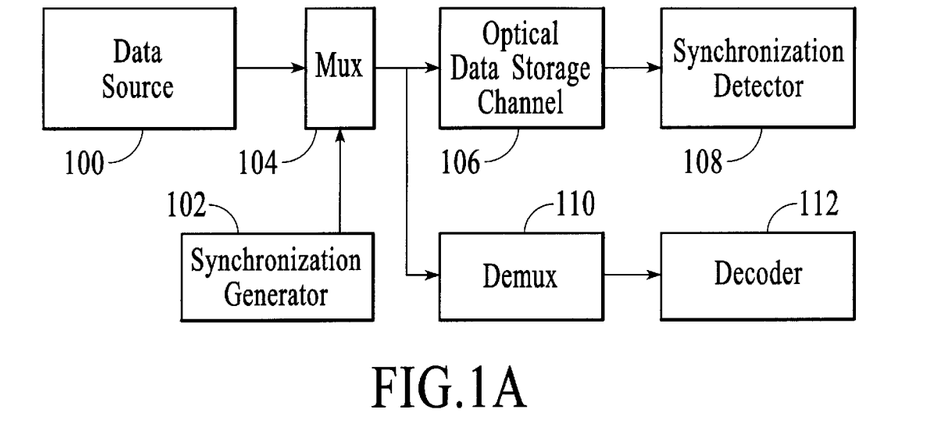
FIG. 1A is a block diagram illustrating a multilevel data storage system for introducing synchronization patterns into a data stream and detecting them.

FIG. 1A is a block diagram illustrating a multilevel data storage system for introducing synchronization patterns into a data stream and detecting them. A data source 100 produces a stream of multilevel data symbols. A synchronization generator 102 produces the synchronization pattern which contains the PN sequence. A multiplexer 104 inserts the synchronization pattern into the data stream at the start of each sector of data. The multiplexed stream enters the optical data storage channel 106, which represents the combination of writing to and reading from an optical disc, as well as analog processing and sampling of the read signal via an analog-to-digital (A/D) converter. Each multilevel symbol corresponds to a multilevel mark on the disc. A synchronization detector 108 locates the synchronization pattern within the sampled read signal, and a demultiplexer 110 removes samples associated with the synchronization pattern starting at the location that the synchronization detector 108 provides. Finally a decoder 112 decodes the samples to obtain the original data.

Figure 1B:
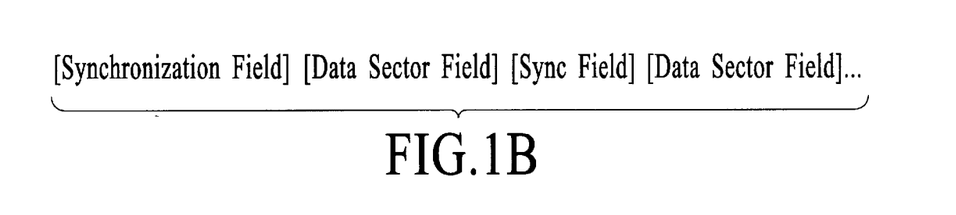
FIG. 1B is a diagram illustrating a data format.

FIG. 1B is a diagram illustrating the corresponding data format, which includes alternating Synchronization Fields 120 and Data Sector Fields 122, where each Synchronization Field contains the synchronization pattern, and each Data Sector Field contains a sector of user data.

Figure 2:
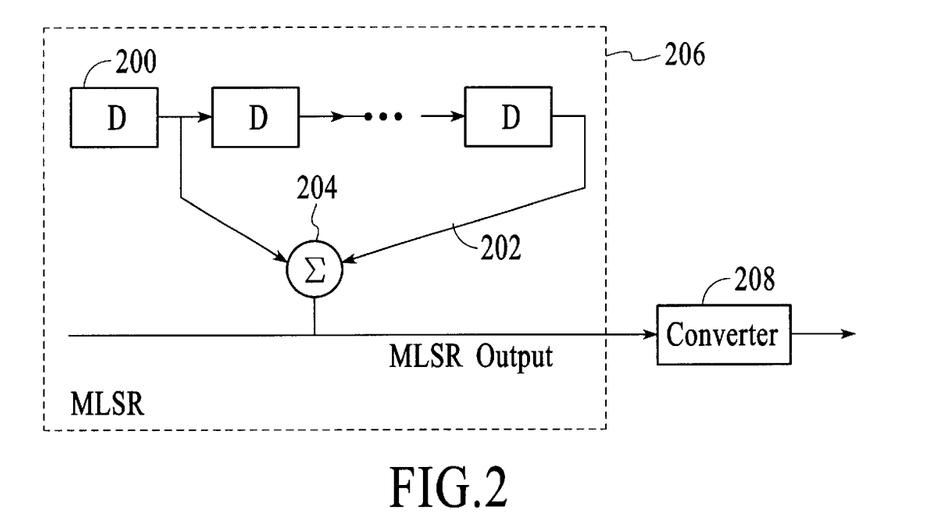
FIG. 2 is a block diagram illustrating a synchronization generator that uses a maximal-length shift register (MLSR) to generate a PN sequence.

FIG. 2 is a block diagram illustrating a synchronization generator that uses a maximal-length shift register (MLSR) to generate a PN sequence. Bit delay elements 200 store the current state of the shift register. Connections 202 between the delay elements and a summer 204 control the output of the shift register. The output of the shift register is fed back into the input of the first delay element one clock cycle after the output is generated. Because there are a finite number of states in the shift register, after a number of bit shifts, the shift register eventually returns to its starting state. The output sequence of bits, therefore, eventually repeats and is periodic. If there are L bit delay elements in the shift register, then there are $2^L$ possible states. The largest period possible, or the maximum length, is $2^L-1$. (If the shift register is in state zero, then it will always remain in state zero.) For a given L, only certain connections will result in such a maximal-length shift register. Such connections, and MLSR's in general, are described in detail in *Digital Communications*, Second Edition, Edward A. Lee, David G. Messerschmitt, Kluwer Academic Publishers, 1996, which is herein incorporated by reference for all purposes. The bits in the PN sequence are also called chips. (This terminology arises from CDMA, where each data bit or symbol is multiplied by the entire PN sequence.) For an L-bit MLSR, let $p_j$, j=1 ... $2^L-1$, represent the chips in PN sequence. For example, when L=3 bits, $p_j=\{1, 1, 1, 0, 0, 1, 0\}$. The dotted box 206 encompassing the delay elements 200, bit connections 202, and summer 204, is an MLSR.

The MLSR output enters a converter 208 that converts each chip of the PN sequence to one or more multilevel symbols. Let $q_k$, k=1 ... $N(2^L-1)$, represent the symbols in the synchronization pattern, where N is the number of symbols per chip, or symbol repetition factor. If there are M levels, then the lowest and highest levels are symbols 0 and M−1, respectively. In one embodiment, the converter converts chip 0 to symbol 0, and chip 1 to symbol M−1. This is the positive orientation for the synchronization pattern with repetition factor N=1. Continuing the example, if M=8 levels, then the synchronization pattern is $q_k=\{7, 7, 7, 0, 0, 7, 0\}$. In another embodiment, the converter converts chips 0 and 1 to symbols M−1and 0, respectively. This is the negative orientation, with a corresponding example synchronization pattern of $q_k=\{0, 0, 0, 7, 7, 0, 7\}$. In other embodiments, the converter can convert chips 0 and 1 to other pairs of symbols, but the lowest and highest symbols provide the greatest differentiation, making the synchronization pattern most distinct and thus easiest to detect. In another embodiment, the converter converts chip 0 to symbol 0 repeated N>1 times, and likewise for chip 1 to symbol M−1 repeated n times. In another embodiment, the converter uses a negative orientation with each chip resulting in N>1 repeated symbols. For example, if L=3 bits, M=8 levels, N=2 symbols per chip, and the orientation is positive, then the synchronization pattern is $q_k=\{7, 7, 7, 7, 7, 7, 0, 0, 0, 0, 7, 7, 0, 0\}$.

In some embodiments, the read side oversamples the read signal by a factor P; that is, the read side samples P times per symbol. The read side may oversample in order for a digital equalizer to be more robust in the presence of fixed sampling offsets. (See, for example, Lee and Messersschmitt.) For example, when P=2 samples per symbol, half of the samples occur at the centers of the marks, and the other half occur in between pairs of marks.

Suppose that the channel is linear and time-invariant (LTI), with LTI responses $h_k^{(i)}$, where i=1 ... P are the sampling phases and k is the time index. For example, using 600 nm marks on a CD-RW disc with P=2 times oversampling, the center samples have LTI response $h_k^{(1)}=\{0.2, 0.6, 0.2\}$ and the in-between samples have LTI response $h_k^{(2)}=\{0.5, 0.5\}$.

Figure 3:
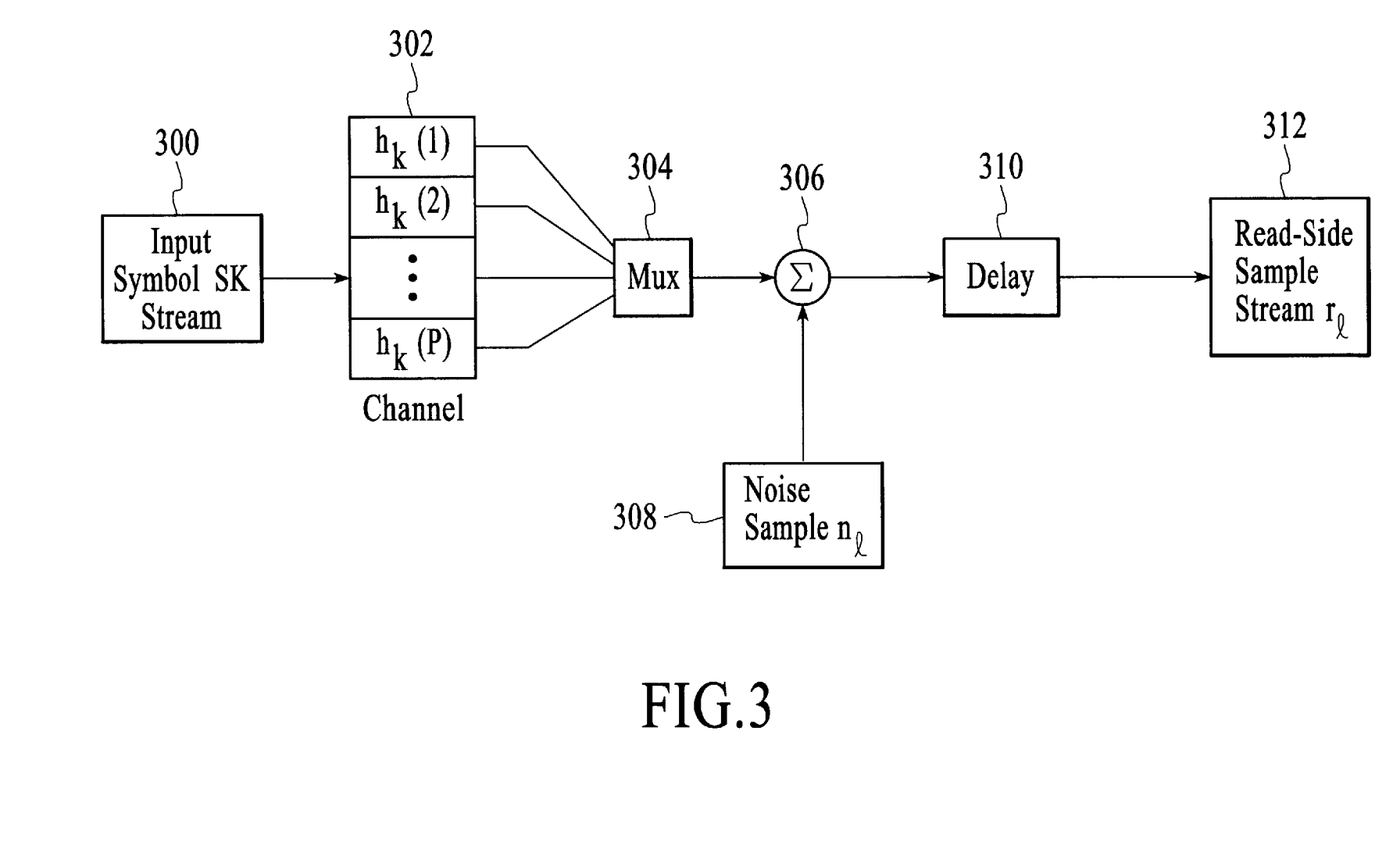
FIG. 3 is a block diagram illustrating a model of the oversampled optical data storage channel.

FIG. 3 is a block diagram illustrating a model of the oversampled optical data storage channel. The input symbol stream $s_k$ 300 is written to a channel 302 and read with P times oversampling. The P sampling phases have channel LTI responses $h_k^{(i)}$, i=1 ... P. A multiplexer 304 combines the P channel outputs. An adder 306 adds noise samples $n_l$ 308 to the channel output to represent laser, media, and electronics noise that corrupts the read signal. A delay element 310 introduces some unknown constant sampling phase delay experienced by the read side. The read-side sample stream $r_l$ 312 is given by:

$$r_{Pk+i+\Delta}=s_k*h_k^{(i)}+n_{Pk+i}, i=1 \ldots P,$$

where * represents the convolution operator, i is the sampling phase index, $\Delta$ is the unknown sampling phase offset, k is the symbol time index, and $1=Pk+i+\Delta$ is the upsampled time index.

The synchronization pattern $q_k$ is embedded somewhere within the input symbol stream $s_k$, and corresponding samples $u_l$ occur somewhere within the read-side sample stream $r_l$. The sample stream enters a synchronization detector whose goal is to locate these synchronization pattern samples $u_l$ and to determine the unknown sampling phase offset $\Delta$.

Figure 4A:
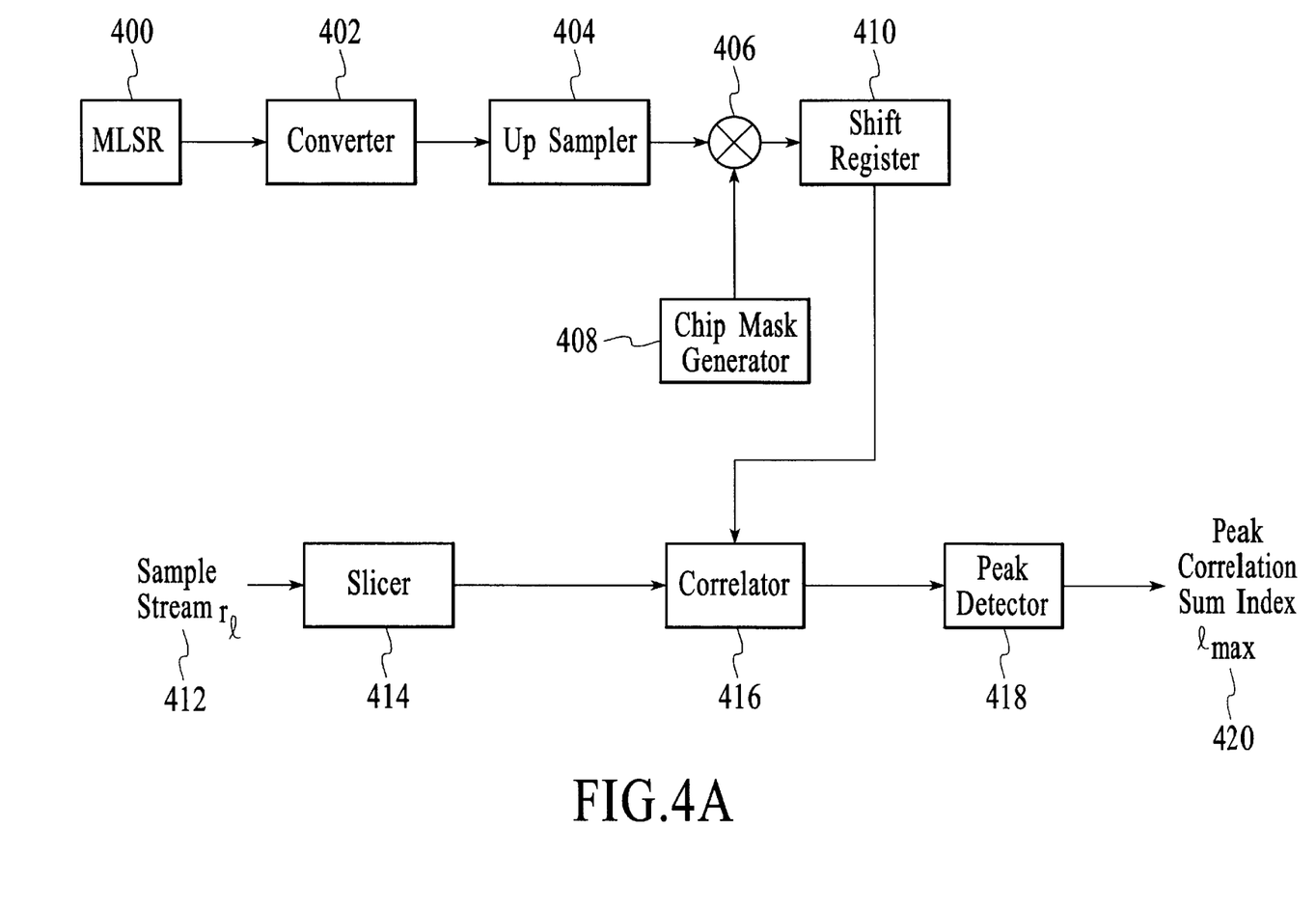
FIG. 4A is a block diagram illustrating the synchronization detector.

FIG. 4A is a block diagram illustrating the synchronization detector. A MLSR 400 generates the same PN sequence $p_j$ used by the write-side synchronization generator. The PN sequence enters a converter 402 that converts PN chip 0 to −1 and PN chip 1 to +1; i.e., the output is $2p_j-1$. The converted PN sequence enters an upsampler 404, which repeats each chip N*P times, where P is the oversampling factor and N is the symbol repetition factor. Finally, the upsampled PN sequence enters a multiplier 406 that multiplies each repeated chip by a chip mask value. The chip mask generator 408 produces a periodic chip mask of length N*P; the selection of an appropriate chip mask is discussed below. A shift register 410 loads the final masked PN sequence, denoted $x_n$, n=1 ... $NP(2^L-1)$.

The sample stream $r_l$ 412 enters a slicer 414 that converts each sample into one of K>1 levels. K may or may not have any relation to M, the number of data symbol levels, since the synchronization pattern uses only two of those M levels. The slicer threshold levels $t_1$ to $t_{K-1}$ are chosen according to the range of the samples $r_l$, that is, the range of the A/D converter, and are not necessarily uniformly spaced. The sliced sample stream $v_1$ is given by:

$$v_l=0 \text{ if } r_l<t_1; 1 \text{ if } t_1<=r_l<t_2; \ldots; K-1 \text{ if } t_{K-1}<=r_l.$$

The sliced sample stream $v_1$ and masked PN sequence $x_n$ enter a correlator 416 that, at each time index l, multiplies the two sequences together and adds to form the correlation sum $S_1$ given by:

$$S_l=\Sigma_{n=1\ldots NP(2^L-1)} v_{1+n} x_n.$$

When correlating against random data, the correlation sum $S_1$ will be very small. However, when the PN sequence embedded in the sliced sample stream appears, the correlation sum $S_1$ will quickly rise to a maximum and then quickly fall as the PN sequence passes by. The time index $l=l_{max}$ when the correlation sum $S_1$ reaches a maximum is the desired alignment that the synchronization detector seeks to detect. Consequently, the sequence of correlation sums $S_1$ enters a peak detector 418 to locate $l_{max}$ 420, which is the output of the synchronization detector.

Figure 4B:
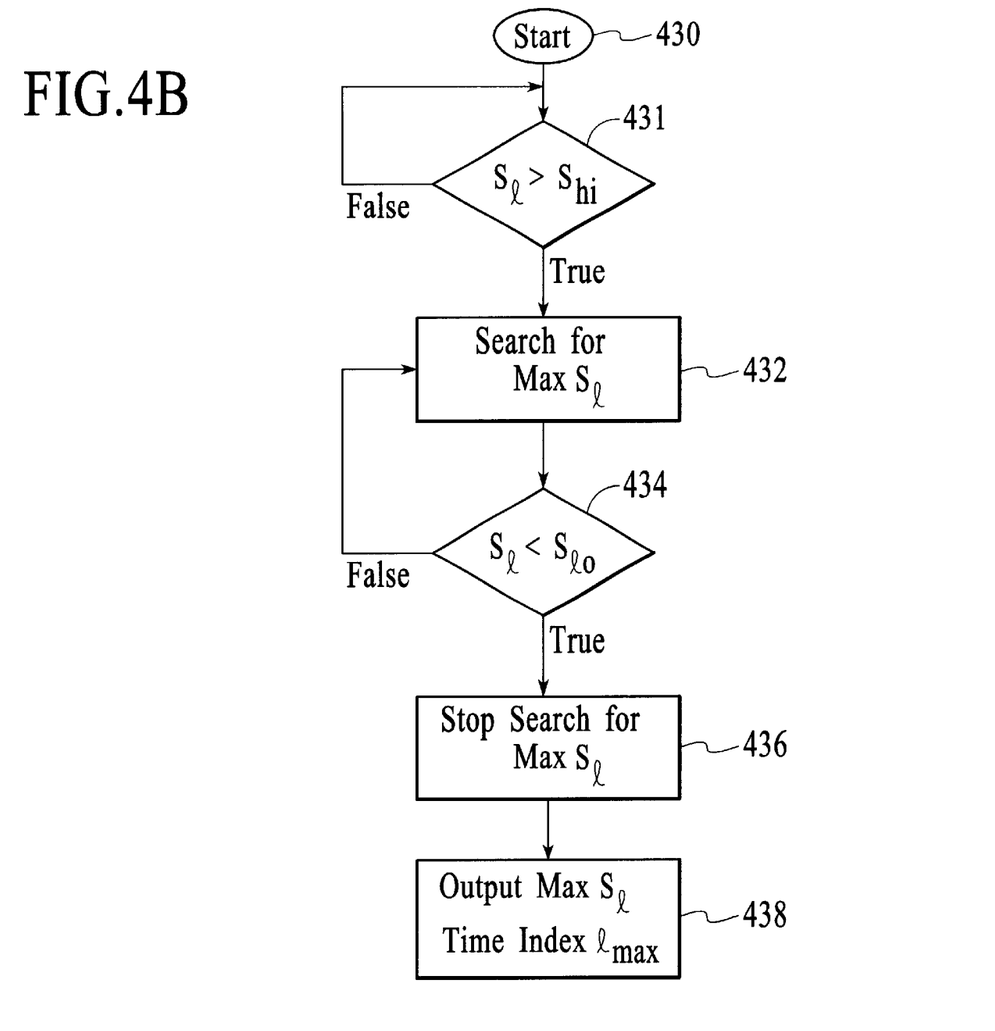
FIG. 4B is a flow chart illustrating the operation of the peak detector.

FIG. 4B is a flow chart illustrating the operation of the peak detector. The peak detector has two threshold levels $S_{hi}$ and $S_{lo}$, where $S_{hi}>S_{lo}$. The process starts at 430. In step 431, it is determined whether the correlation sum $S_1$ exceeds the high threshold $S_{hi}$. When the correlation sum $S_1$ exceeds the high threshold $S_{hi}$, control is transferred to step 432 and the peak detector starts searching for the maximum value. In step 434, it is determined whether the correlation sum $S_1$ falls below the low threshold $S_{lo}$. When the correlation sum $S_1$ falls below the low threshold $S_{lo}$, control is transferred to step 436 and the peak detector stops. The time index $l_{max}$ corresponding to the maximum correlation found within the search interval is output in step 438.

Preferably, the high threshold $S_{hi}$ is chosen much higher than correlation sums with data preceding the synchronization pattern, so that random noise will have an extremely low probability of falsely triggering the peak detector too soon. The low threshold $S_{lo}$ is chosen somewhat lower than the high threshold $S_{hi}$ so that as the correlation sum $S_1$ crosses $S_{hi}$, random noise will have an extremely low probability of pulling the correlation sum $S_1$ below $S_{lo}$. The choice of $S_{hi}$ and $S_{lo}$ depend on the characteristics of a particular system. Typically, values of 60% and 40%, respectively, of the expected maximum correlation sum are appropriate. The expected maximum correlation sum depends on several factors, specifically the length $(2^L-1)$ of the PN sequence, the symbol repetition factor N, the oversampling factor P, the channel responses $h_k$, the number of slicer levels K, and the chip mask.

It is important that the correlation sum reaches a distinct maximum at the same sampling index regardless of variations due to random noise and to changes in the channel response. Correlation sums immediately preceding and following the maximum correlation (i.e., $S_1$ at time indexes $l=l_{max}-1$ and $1=l_{max}+1$) differ by only a slight phase offset in the PN sequence from that of the maximum correlation, and hence are very close to the maximum correlation. The choice of chip mask for a given oversampling factor P and symbol repetition factor N enables the peak detector to identify not just the approximate location, but also the exact sampling phase, of the PN sequence embedded within the sampled read sequence.

For example, in the simple case where N=1 symbol per chip and P=1 sample per symbol, the chip mask is simply $\{1\}$. If L=3 bits in the MLSR, the PN sequence $p_j=\{1, 1, 1, 0, 0, 1, 0\}$ is converted to $\{1, 1, 1, -1, -1, 1, -1\}$. In this degenerate case, N*P=1 so there is no upsampling, and the masked PN sequence is simply $x_n=\{1, 1, 1, -1, -1, 1, -1\}$. The synchronization detector merely needs to locate the sample corresponding to the first symbol of the PN sequence; there are no sampling phases to distinguish.

When N=1 symbol per chip but P=2 samples per symbol, the synchronization detector must distinguish between center and in-between samples. The upsampled chip sequence is $\{1,1,1,1,1,1,-1,-1,-1,-1,1,1,-1,-1,=1\}$. Suppose it uses a straightforward chip mask with period $\{1, 1\}$, so that the entire chip mask is $\{1, 1, 1, 1, 1, 1, 1, 1, 1, 1, 1, 1, 1, 1\}$ and the masked PN sequence is $x_n=\{1, 1, 1, 1, 1, 1, -1, -1, -1, -1, 1, 1, -1, -1\}$. With this chip mask, the synchronization detector can not reliably distinguish the sampling phase, that is, distinguish between center samples and in-between samples.

To understand why this is so, consider a simple channel model where center samples have a channel response $h_k^{(1)}=\{1\}$ (i.e., no intersymbol interference) and in-between samples have a channel response $h_k^{(2)}=\{0.5, 0.5\}$ (the average of the surrounding pair of symbols). Let M=8 levels. The synchronization generator produces a synchronization pattern $q_k=\{7, 7, 7, 0, 0, 7, 0\}$. Suppose the symbols preceding and following the synchronization pattern are a and b, respectively, so that the symbol stream written to the channel is $s_k=\{\ldots, a, 7, 7, 7, 0, 0, 7, 0, b, \ldots\}$. The noiseless read samples are then $r_l=\{\ldots, a, a/2+3.5, 7, 7, 7, 7, 7, 3.5, 0, 0, 0, 3.5, 7, 3.5, 0, b/2, b, \ldots\}$. In the interest of simplicity, noise and effects of the slicer are temporarily ignored, and correlation sums are calculated directly between the masked PN sequence and noiseless read sample sequence. These correlation sums are:

$$S_0=a+a/2+3.5+7+7+7-7-3.5-0-0+0+3.5-7-3.5=3a/2+14,$$

$$S_1=a/2+3.5+7+7+7+7-3.5-0-0-0+3.5+7-3.5-0=a/2+42,$$

$$S_2=7+7+7+7+3.5-0-0-0-3.5+7+3.5-0-b/2=45.5-b/2,$$

$$S_3=7+7+7+7+3.5+0-0-0-3.5-7+3.5+0-b/2-b=24.5-3b/2.$$

$S_0$ and $S_3$ are substantially below $S_1$ and $S_2$, regardless of the symbols a and b. However, $S_1$ and $S_2$ are nearly the same. If a=b=0, then $S_2=45.5$ is larger than $S_1=42$. However, if a=b=7, then $S_1=45.5$ is larger than $S_2=42$. So, depending on the surrounding symbols, the peak detector might choose $S_1$ or $S_2$. While this is sufficient for identifying the location of the synchronization pattern within the length of a symbol (two samples), when the effects of noise are considered, the synchronization detector does not consistently identify the same sampling phase.

In contrast, if the synchronization detector uses the chip mask $\{1, 0\}$, then it can reliably identify both the location and the exact sampling phase. The entire chip mask sequence is {1, 0, 1, 0, 1, 0, 1, 0, 1, 0, 1, 0, 1, 0}, the masked chip sequence is $x_n$={1, 0, 1, 0, 1, 0, −1, 0, −1, 0, 1, 0, −1, 0}, and the corresponding four correlation sums are:

$S_0 = a+0+7+0+7+0-7-0-0+0+0+0-7+0 = a <= 7,$ $S_1 = a/2+3.5+0+7+0+7+0-3.5+0-0+0+3.5+0-3.5+0 = a/2+14 <= 17.5,$ $S_2 = 7+0+7+0+7+0-0+0-0+0+7+0-0+0 = 28,$ $S_3 = 7+0+7+0+3.5+0-0+0-3.5+0+3.5+0-b/2+0 = 17.5-b/2 <= 17.5.$

The maximum $S_2$ is clearly larger than adjacent sums $S_1$ and $S_3$, which in turn are larger than sums $S_0$ and $S_4 = 7-b <= 7$, regardless of the surrounding symbols a and b. Even when noise corrupts the read samples, the probability that $S_1$ or $S_3$ becomes greater than $S_2$ is very small, so the synchronization detector will consistently choose $S_2$. In this example, appropriate threshold values could be $S_{hi} = 0.6 * S_2 = 16.8$ and $S_{lo} = 0.4 * S_2 = 11.2$, so that sum $S_1$ or $S_2 > S_{hi}$ triggers the peak detector, and sum $S_4 < S_{lo}$ ends the search. If possible, symbols a and b, are chosen to be a=0 and b=7 in order to maximize the difference between $S_2$ and adjacent sums $S_1$ and $S_3$.

When N=2 symbols per chip and P=1 sample per symbol, then it is best to use the chip mask {1, 1} and not {1, 0}. Using the chip mask {1, 0}, the synchronization detector cannot distinguish between the first and second symbols of each chip, so the correlation sum will have a flat maximum over two consecutive sums, as illustrated by the following example where M=8 levels, L=3 bits, and the PN sequence is $p_j$={1, 1, 1, 0, 0, 1, 0}.

With N=2, the synchronization pattern is $q_k$={7, 7, 7, 7, 7, 7, 0, 0, 0, 0, 7, 7, 0, 0} and the symbol stream is $s_k$={ . . . , a, 7, 7, 7, 7, 7, 7, 0, 0, 0, 0, 7, 7, 0, 0, b, c, . . . }, where a, b, and c are arbitrary surrounding symbols. If the channel response is $h_k$={1}, then, ignoring the effects of noise and the slicer, the read sample stream $r_k$ is identical to the symbol stream $s_k$. In the synchronization detector, the PN sequence is converted to {1, 1, 1, −1, −1, 1, −1} and upsampled to {1, 1, 1, 1, 1, 1, −1, −1, −1, −1, 1, 1, −1, −1}. Using the chip mask {1, 0}, the masked chip sequence is $x_n$={1, 0, 1, 0, 1, 0, −1, 0, −1, 0, 1, 0, −1, 0}. The correlation sums are:

$S_0 = a+0+7+0+7+0-7+0-0+0+0+0-7+0 = a <= 7,$ $S_1 = 7+0+7+0+7+0-0+0-0+0+7+0-0+0 = 28,$ $S_2 = 7+0+7+0+7+0-0+0-0+0+7+0-0+0 = 28,$ $S_3 = 7+0+7+0+0+0-0+0-7+0+0+0-b+0 = 7-b <= 7.$

The correlation sums $S_1$ and $S_2$ are identical and clearly larger than surrounding sums $S_0$ and $S_3$. The peak detector can not distinguish between $S_1$ and $S_2$, so the chip mask {1, 0} is not appropriate.

In contrast, the chip mask {1, 1} will provide a unique maximum. The corresponding masked chip sequence is $x_n$={1, 1, 1, 1, 1, 1, −1, −1, −1, −1, 1, 1, −1, −1}, and correlation sums are:

$S_0 = a+7+7+7+7+7-7-0-0-0+0+7-7-0 = a+28 <= 35,$ $S_1 = 7+7+7+7+7-0-0-0-0+7+7-0-0 = 56,$ $S_2 = 7+7+7+7+7+0-0-0-0-7+7+0-0-b = 35-b <= 35,$ $S_3 = 7+7+7+7+0+0-0-0-7-7+0+0-b-c = 14-b-c <= 14,$

Correlation sum $S_1$ is clearly larger than surrounding sums $S_0$ and $S_2$, so the synchronization detector will consistently choose $S_1$ even when noise is present. Once again, if possible, symbols a and b are chosen such that a=0 and b=7 in order to maximize the difference between $S_1$ and adjacent sums $S_0$ and $S_2$.

Finally, when N=2 symbols per chip and P=2 samples per symbol, the chip mask {1, 1, 1, 0} is the best as can be seen from the following example where M=8 levels, L=3 bits, and the PN sequence is $p_j$={1, 1, 1, 0, 0, 1, 0}.

With N=2, the synchronization pattern is $q_k$={7, 7, 7, 7, 7, 7, 0, 0, 0, 0, 7, 7, 0, 0} and the symbol stream is $s_k$={ . . . , a, 7, 7, 7, 7, 7, 7, 0, 0, 0, 0, 7, 7, 0, 0, b, . . . }, where a and b are arbitrary surrounding symbols. If the channel response is $h_k^{(1)}$={1} for center samples and $h_k^{(2)}$={0.5, 0.5} for in-between samples, then, ignoring the effects of noise and the slicer, the read sample stream is $r_l$ is $r_l$={ . . . , a, a/2+3.5, 7, 7, 7, 7, 7, 7, 7, 7, 7, 3.5, 0, 0, 0, 0, 0, 0, 3.5, 7, 7, 7, 3.5, 0, 0, 0, b/2, b, . . . }. In the synchronization detector, the PN sequence is converted to {1, 1, 1, −1, −1, 1, −1} and upsampled to {1, 1, 1, 1, 1, 1, 1, 1, 1, 1, 1, 1, −1, −1, −1, −1, −1, −1, −1, −1, 1, 1, 1, 1, −1, −1, −1, −1}. Using the chip mask {1, 1, 1, 0}, the masked chip sequence is $x_n$={1, 1, 1, 0, 1, 1, 1, 0, 1, 1, 1, 0, −1, −1, −1, 0, −1, −1, −1, 0, 1, 1, 1, 0, −1, −1, −1, 0}. The correlation sums are:

$S_0 = 3a/2+42 <= 52.5,$ $S_1 = a/2+70 <= 73.5,$ $S_2 = 84,$ $S_3 = 73.5-b/2 <= 73.5,$ $S_4 = 52.5-3b/2 <= 52.5.$

The peak correlation sum occurs at $S_2$, which is significantly higher than adjacent sums $S_1$ and $S_3$, which in turn are much higher than $S_0$ and $S_4$. Once again, if possible, symbols a and b, are chosen such that a=0 and b=7 in order to maximize the difference between $S_2$ and adjacent sums $S_1$ and $S_3$.

Similarly appropriate chip masks for other values of N and P can be selected by determining the chip mask that produces a distinct peak correlation sum. For P=1, N arbitrary, the chip mask {1, . . . , 1} (all-ones) should be appropriate. For N=1, P arbitrary, the chip mask {1, 0, . . . , 0} (one, followed by P−1 zeroes) should be appropriate, though not necessarily the best.

In the above examples, the synchronization detector uses a fairly high precision (4 bits for each read sample) to compute the correlation sums. It is preferable not to form correlation sums $S_1$ using such high precision because the detector to reduce the number of computations performed per sample time 1. For example, in the last example where N=2 symbols per chip and P=2 samples per symbol, each correlation sum requires approximately 20 8-bit signed additions. The A/D converter (ADC) in the read electronics, which was incorporated within the channel 106 in the block diagram of FIG. 1, will generally have a much higher precision, say 8 or 10 bits, which is generally too high for forming the correlation sums.

Consequently, the synchronization detector has a slicer that reduces the precision of the read samples from the ADC precision down to K levels ($\log_2 K$ bits). The simplest case is K=2 levels, or 1 bit of precision. If the range of the read samples is 0 to 7 (plus random noise), then the slicer threshold may be set to 3.5. Any read sample above the slicer threshold becomes 1, and any sample below the threshold becomes 0. When P=2 samples per symbol, some of the in-between samples are around the threshold of 3.5, but random noise may bring them above or below the slicer threshold.

Considering the case where N=1 symbol per chip and P=2 samples per symbol, and a slicer with K=2 levels, the noiseless read samples are $r_j=\{\ldots, a, a/2+3.5, 7, 7, 7, 7, 7, 3.5, 0, 0, 0, 3.5, 7, 3.5, 0, b/2, b, \ldots\}$. Choosing adjacent symbols a=0 and b=7 to maximize the difference between the correlation peak and adjacent sums, the noiseless read samples are $r_j=\{\ldots, 0, 3.5, 7, 7, 7, 7, 7, 3.5, 0, 0, 0, 3.5, 7, 3.5, 0, 3.5, 7, \ldots\}$. The sliced read samples are $v_1=\{\ldots, 0, X, 1, 1, 1, 1, 1, X, 0, 0, 0, X, 1, X, 0, X, 1, \ldots\}$, where X=0 or 1 is unknown due to noise. (It is unlikely that the random noise will be so large that a read sample 0 will rise above the slicer threshold, or a read sample 7 will fall below the slicer threshold.) Using chip mask $\{1, 0\}$, the masked chip sequence is $x_n=\{1, 0, 1, 0, 1, 0, -1, 0, -1, 0, 1, 0, -1, 0\}$, and the correlation sums are:

$$S_0=0+0+1+0+1+0-1-0-0+0+0+0-1+0=0,$$

$$S_1=X+0+1+0+1+0-X+0-0+0+X+0-X+0=2+/-4,$$

$$S_2=1+0+1+0+1+0-0+0-0+0+1+0-0+0=4,$$

$$S_3=1+0+1+0+X+0-0+0-X+0+X+0-X+0=2+/-4,$$

$$S_4=1+0+1+0+0+0-0+0-1+0+0+0-1+0=0.$$

The reduction of precision and the effects of noise could cause $S_1$ or $S_3$ to be as high as 6, which is greater than $S_2=4$. Either a higher precision (more slicer levels K) or a longer PN sequence, or both, is required to obtain reliable performance.

If, K=3 levels $\{-1, 0, +1\}$ for the previous example, better results are obtained. Slicer thresholds can be set evenly spaced, i.e., set to (0+3.5)/2=1.75 and (3.5+7)/2=5.25. Then the sliced read samples are $v_1=\{\ldots, -1, 0, 1, 1, 1, 1, 1, 0, -1, -1, -1, 0, 1, 0, -1, 0, 1, \ldots\}$, and the correlation sums are:

$$S_0=(-1)+0+1+0+1+0-1-0-(-1)+0+(-1)+0-1+0=-1,$$

$$S_1=0+0+1+0+1+0-0-0-(-1)+0+0+0-0+0=3,$$

$$S_2=1+0+1+0+1+0-(-1)+0-(-1)+0+1+0-(-1)+0=7,$$

$$S_3=1+0+1+0+0+0-(-1)+0-0+0+0+0-0+0=3,$$

$$S_4=1+0+1+0+(-1)+0-(-1)+0-1+0+(-1)+0-1+0=-1.$$

$S_2$ is distinctly larger than adjacent sums $S_1$ and $S_3$. Even if an unusually large noise sample distorted a sample, causing an error in the slicer output, $S_2$ would still be the largest sum.

Figure 5:
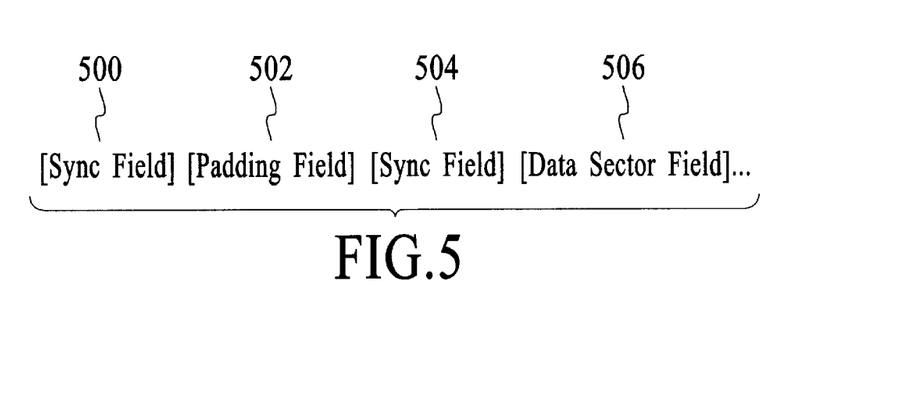
FIG. 5 shows the data format for this embodiment.

In one embodiment, only a single PN sequence is inserted at the start of each data sector. There is a risk, however, that a defect, such as a scratch or dust mote, on the optical disc will wipe out the PN sequence. In another embodiment, two PN sequences, separated by a distance longer than the typical defect length, are inserted at the start of each sector. In one embodiment, the two PN sequences have the same orientation, so that the same synchronization detector can detect both PN sequences. FIG. 5A shows the data format for this embodiment. The two Synchronization Fields 500 and 504 contain PN sequences of the same polarity. The Padding Field 502 separating the two Synchronization Fields can contain user data or some other necessary data, such as sector identification. The Data Sector Field 506 contains the sector of user data, less any that is placed in the Padding Field. However, if a defect eliminates one of the PN sequences, the synchronization detector will not know which one is lost, and hence will not know precisely where the data starts.

In another embodiment, the two PN sequences have opposite orientation, so that if a defect eliminates one of the PN sequences, the synchronization detector can identify which one was lost. The data format is identical to that of FIG. 5, but the second Synchronization Field 504 contains a PN sequence of the opposite polarity of that of the first Synchronization Field 500. Suppose the PN sequences have opposite orientation, with positive orientation preceding negative orientation. The synchronization detector uses positive and negative thresholds $S_{hi}$ and $-S_{hi}$, respectively. If the correlation sum $S_1$ rises above $S_{hi}$, then it starts searching for the maximum correlation sum as before, until the correlation sum falls below $S_{lo}$. After locating the first PN sequence, it can then search for the second PN sequence at the expected location by detecting when the correlation sum falls below $-S_{hi}$. It searches for the minimum correlation sum in a similar manner until the correlation sum rises above $-S_{lo}$.

However, if the correlation sum does not rise above $S_{hi}$ but first falls below $-S_{hi}$, then the detector determines that the first PN sequence was lost and begins searching for the minimum correlation sum until the correlation sum rises above $-S_{lo}$.

The synchronization detectors for detecting PN sequences with positive and negative orientations are very similar, so using PN sequences with opposite orientation does not require a synchronization detector that is substantially more complicated than one using PN sequences with the same orientation.

In other embodiments, multiple PN sequences with various orientations can be inserted in multiple locations at the start or within each sector of data.

In the preceding examples, the PN sequence was relatively short, only 7 chips long, so false detections of the PN sequence within the user data would be rather high. In general, longer PN sequences are required. In one embodiment, that uses only a single PN sequence, a PN sequence on the order of 31 or 63 chips long, is required. If an embodiment uses multiple PN sequences, then a shorter PN sequence, on the order of 7 or 15 chips long may suffice.

Figure 6:
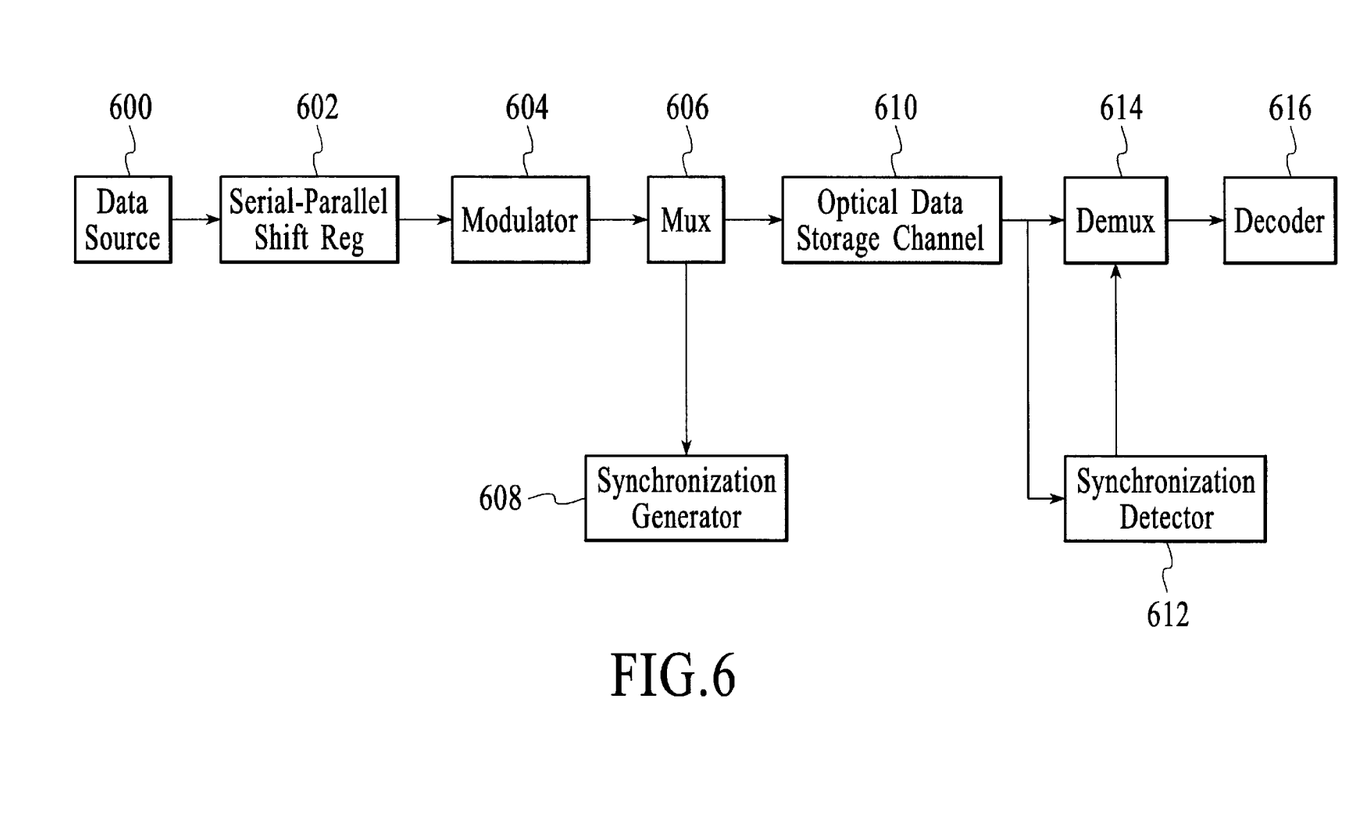
FIG. 6 is a block diagram illustrating a system wherein synchronization is provided for a multilevel optical data storage system that uses modulation with two-dimensional cross constellations.

FIG. 6 is a block diagram illustrating a system wherein synchronization is provided for a multilevel optical data storage system that uses modulation with two-dimensional cross constellations. A data source 600 produces a stream of data bits which enter a serial-to-parallel shift register 602. The shift register converts each group of L data bits into an L-bit symbol. The L-bit symbol stream enters a modulator 604 that maps each L-bit symbol into two M-level symbols. The M-level symbol stream enters a multiplexer 606. A synchronization generator 608 produces one or more synchronization patterns, which the multiplexer 606 inserts into the data symbol stream at various predetermined locations within each sector of data. The multiplexed stream enters the optical data storage channel 610, which represents the combination of writing to and reading from an optical disc, as well as analog processing and sampling of the read signal. Each multilevel symbol corresponds to a multilevel mark on the disc. A synchronization detector 612 locates each synchronization pattern within the sampled read signal, and a demultiplexer 614 removes samples associated with the synchronization pattern starting at the location that the synchronization detector 612 provides. Finally a decoder 616 decodes the samples to obtain the original data.

Figure 7A:
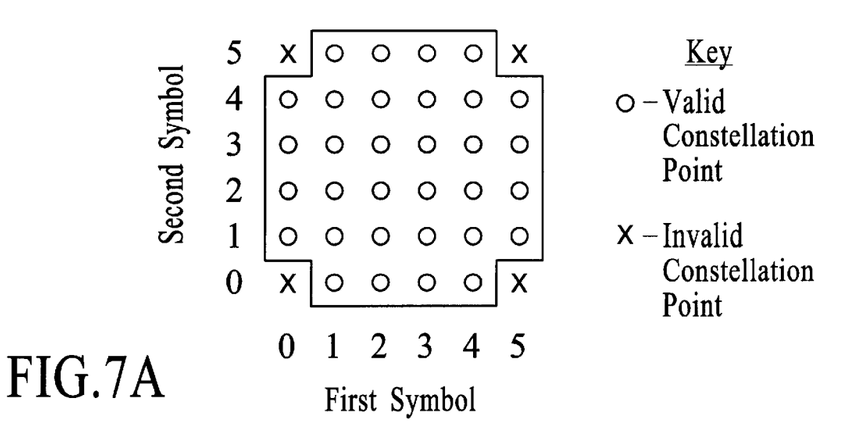
FIGS. 7A and 7B show 32- and 128-cross constellations for L=5 and 7 input data bits resulting in output symbols with M=6 and 12 levels, respectively.
Figure 7B:
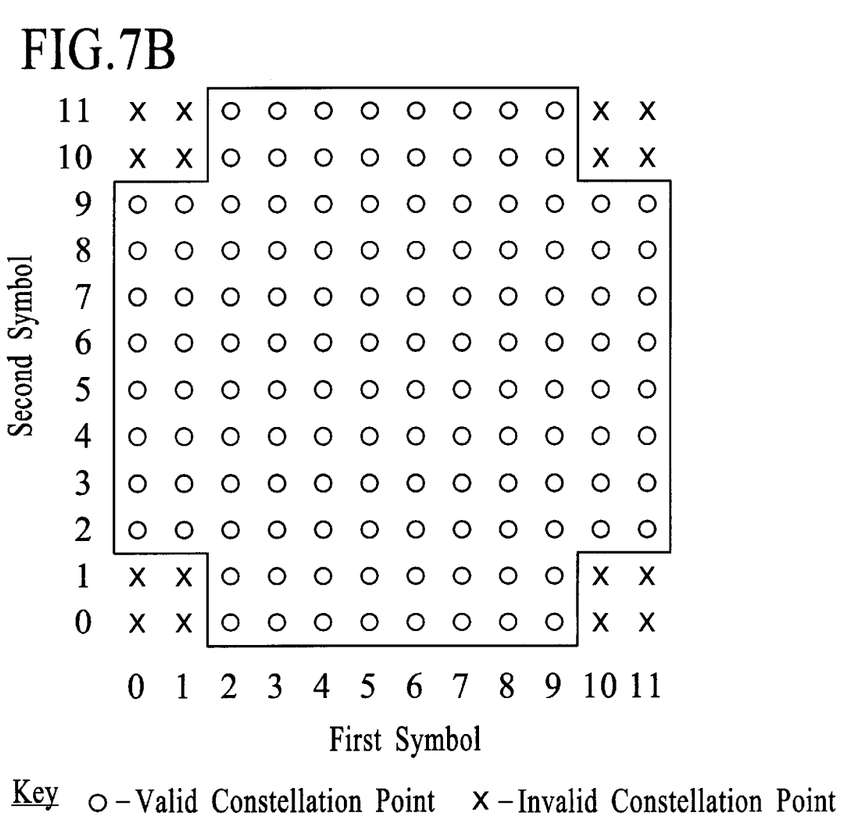

FIGS. 7A and 7B show 32- and 128-cross constellations for L=5 and 7 input data bits resulting in output symbols with M=6 and 12 levels, respectively. Each vertex in the constellation represents a pair of adjacent multilevel symbols that the modulator 604 outputs. The cross constellations do not include corner vertices, so the corresponding pairs of symbols are not allowed in the data stream. Specifically, for the 32-cross constellation, symbol pairs (0, 0), (0, 5), (5, 0), and (5, 5) are invalid data pairs. For the 128-cross constellation, symbol pairs (0, 0), (0, 1), (1, 0), (1, 1), (0, 10), (0, 11), (1, 10), (1, 11), (10, 0), (10, 1), (11, 0), (11, 1), (10, 10), (10, 11), (11, 10), and (11, 11) are all invalid data pairs.

In one embodiment, synchronization patterns that consist entirely of invalid symbol pairs are constructed. The lengths of the synchronization patterns should be sufficiently long that it can contain enough invalid symbol pairs to protect against an overly high false synchronization-detection rate. For example, if L=5 bits (32-cross constellation), M=6 levels, and the synchronization pattern length is N=6 symbols, then one or more of the following synchronization patterns can be used:

| Sync0:0 | 0 | 0 | 0 | 0 | 0 |
|---|---|---|---|---|---|
| Sync1:5 | 5 | 5 | 5 | 5 | 5 |
| Sync2:0 | 0 | 5 | 5 | 0 | 0 |
| Sync3:5 | 5 | 0 | 0 | 5 | 5 |
| Sync4:0 | 0 | 0 | 0 | 5 | 5 |
| Sync5:5 | 5 | 5 | 5 | 0 | 0 |
| Sync6:5 | 5 | 0 | 0 | 0 | 0 |
| Sync7:0 | 0 | 5 | 5 | 5 | 5 |

If L=7 bits (128-cross constellation), M=12 levels, and N=6 symbols, then one can use one or more of the following synchronization patterns:

| Sync0:0 | 0 | 0 | 0 | 0 | 0 |  |
|---|---|---|---|---|---|---|
| Sync1:11 | 11 | 11 | 11 | 11 | 11 |  |
| Sync2:0 | 0 | 11 | 11 | 0 | 0 |  |
| Sync3:11 | 11 | 0 | 0 | 11 | 11 |  |
| Sync4:0 | 0 | 0 | 0 | 11 | 11 |  |
| Sync5:11 | 11 | 11 | 11 | 0 | 0 |  |
| Sync6:11 | 11 | 0 | 0 | 0 | 0 |  |
| Sync7:0 | 0 | 11 | 11 | 11 | 11 |  |
| Sync8:1 | 1 | 1 | 1 | 1 | 1 |  |
| Sync9:10 | 10 | 10 | 10 | 10 | 10 |  |
| Sync10: | 1 | 1 | 10 | 10 | 1 | 1 |
| Sync11: | 10 | 10 | 1 | 1 | 10 | 10 |
| Sync12: | 1 | 1 | 1 | 1 | 10 | 10 |
| Sync13: | 10 | 10 | 10 | 10 | 1 | 1 |
| Sync14: | 10 | 10 | 1 | 1 | 1 | 1 |
| Sync15: | 1 | 1 | 10 | 10 | 10 | 10 |

Figure 8A:
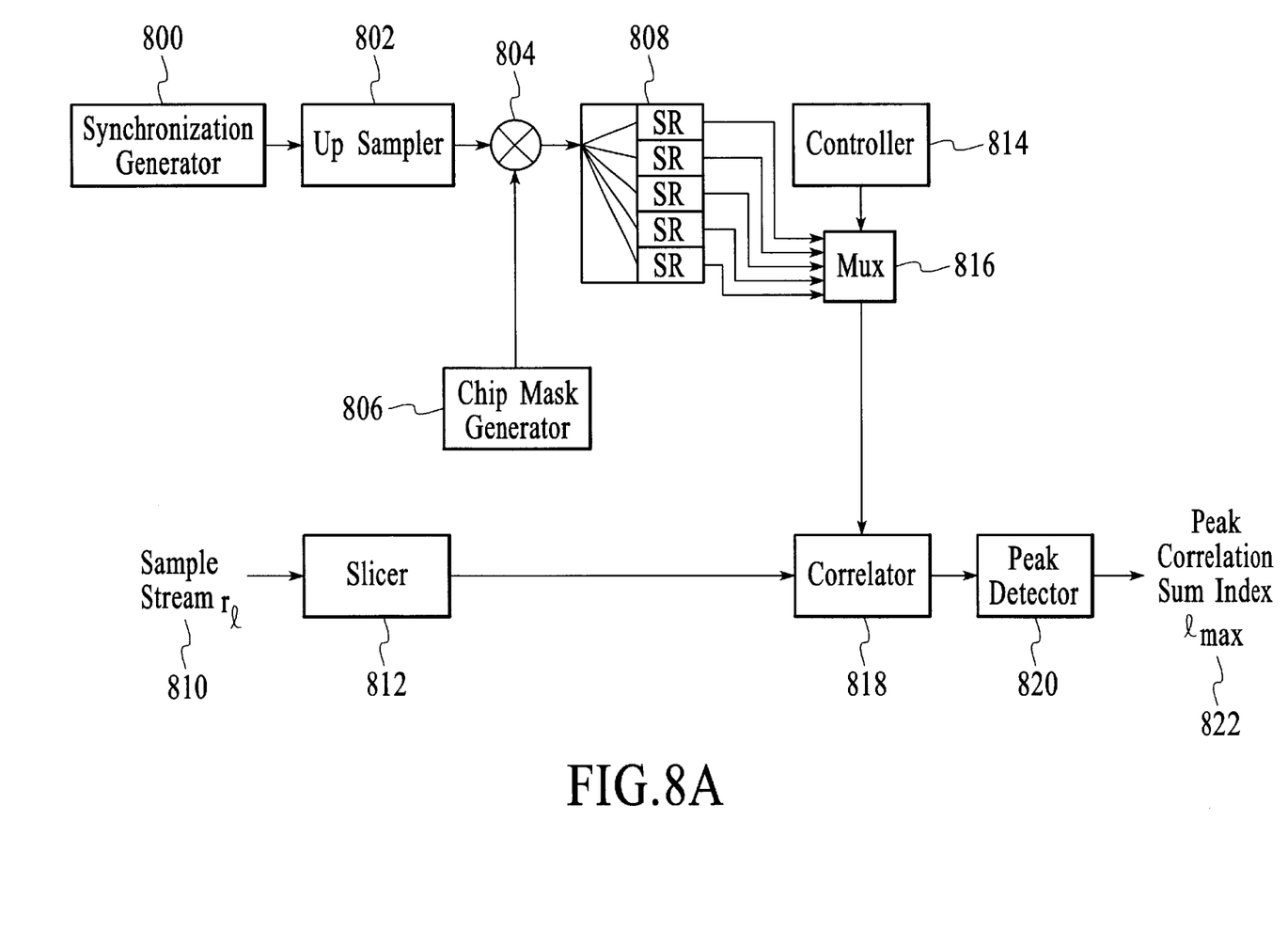
FIG. 8A is a block diagram illustrating a synchronization detector.

FIG. 8A is a block diagram illustrating a synchronization detector. A synchronization generator 800 generates the same synchronization patterns SyncX, X=0, . . . , used by the write-side synchronization generator. The synchronization patterns enter an upsampler 802, which repeats each symbol P times, where P is the oversampling factor. Finally, each upsampled synchronization pattern enters a multiplier 804 that multiplies each repeated symbol by a chip mask value. The chip mask generator 806 produces a periodic chip mask of length P; the selection of an appropriate chip mask can be the same as to that for the PN sequence embodiment. A bank of shift registers 808 loads each final masked synchronization pattern, denoted $x_n^{(k)}$, n=1 . . . NP, where k=0, . . . , specifies the synchronization pattern.

The sample stream $r_l$ 810 enters a slicer 812 that converts each sample into one of K>1 levels. K may or may not have any relation to M, the number of data symbol levels, since the synchronization pattern uses only two or possibly four (for 128-cross constellation) of those M levels. The slicer threshold levels $t_1$ to $t_{K-1}$ are chosen according to the range of the samples $r_j$, that is, the range of the A/D converter, and are not necessarily uniformly spaced. The sliced sample stream $v_1$ is given by:

$v_1$=0 if $r_l<t_1$; 1 if $t_1<=r_l<t_2$; . . . ; K=1 if $t_{K-1}<=r_l$.

A controller 814 selects the next expected synchronization pattern and activates a multiplexer 816 to pass the corresponding masked synchronization pattern from the bank of shift registers 808 to the correlator 818. The sliced sample stream $v_1$ and masked synchronization pattern $x_n$ enter the correlator 818 that, at each time index l, multiplies the two sequences together and adds to form the correlation sum $S_1$ given by:

$$S_1 = \Sigma_{n=1 \ldots NP} v_{1+n} x_n.$$

When correlating against random data, the correlation sum $S_1$ is very small. However, when the synchronization pattern embedded in the sliced sample stream appears, the correlation sum $S_1$ rises to a maximum and then falls as the synchronization pattern passes. The time index $l=l_{max}$ when the correlation sum $S_1$ reaches a maximum is the desired alignment that the synchronization detector seeks to detect. Consequently, the sequence of correlation sums $S_1$ enters a peak detector 820 to locate $1_{max}$ 822, which is the output of the synchronization detector.

Figure 8B:
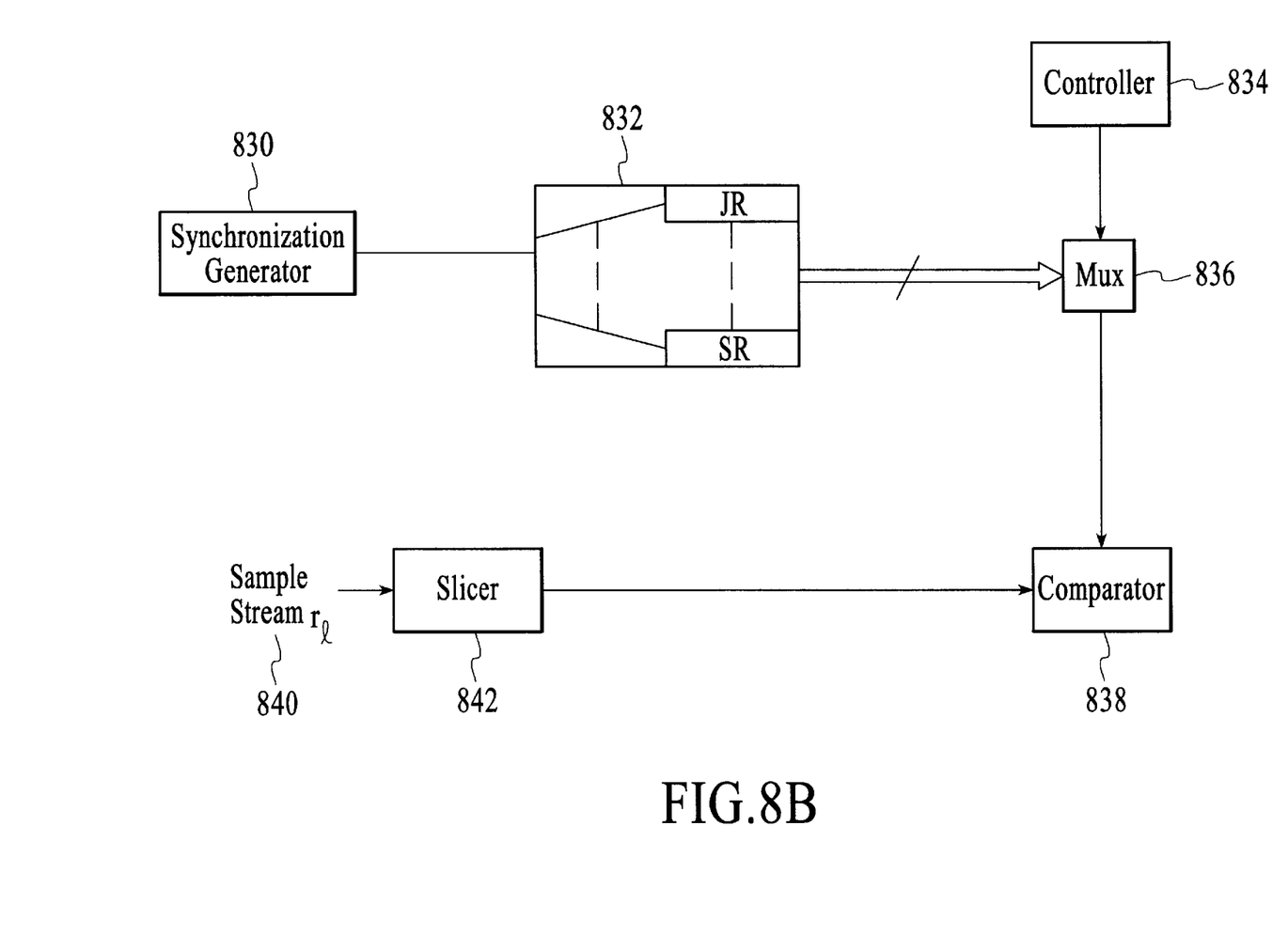
FIG. 8B is a block diagram illustrating an alternate synchronization detector that can be used after equalization or when the channel contains no significant ISI and is sampled at P=1 sample per symbol.

FIG. 8B is a block diagram illustrating an alternate synchronization detector that can be used after equalization or when the channel contains no significant ISI and is sampled at P=1 sample per symbol. (If the channel contains significant ISI or is sampled at P>1 sample per symbol, then a digital equalizer can remove the ISI and downsample to one sample per symbol.) A synchronization generator 830 generates the same synchronization patterns SyncX, X=0, . . . , used by the write-side synchronization generator. A bank of shift registers 832 loads each synchronization pattern, denoted $x_n^{(k)}$, n=1 . . . N, where k=0, . . . , specifies the synchronization pattern. A controller 834 selects the next expected synchronization pattern and activates a multiplexer 836 to pass that synchronization pattern from the bank of shift registers 832 to a comparator 838. The read sample stream $r_l$ 840 enters a slicer 842 with K=M levels that converts each sample into the closest symbol. Slicer levels are set to lie midway between levels of adjacent symbol pairs. (That is, if the symbol levels are 0, 1, . . . , M−1, then the slicer thresholds are 0.5, 1.5, . . . , M−1.5.) The sliced sample stream $v_1$ enters the comparator 838. At each time index l, comparator 838 compares the samples from $v_1$ to $v_{1-N+1}$ with the expected synchronization pattern $x_n$. If the two match exactly, then the synchronization detector has located the synchronization pattern. The controller will normally activate the comparator to search for the next expected synchronization pattern within a narrow window of time that encloses the expected time for the appearance of that synchronization pattern.

Figure 9:
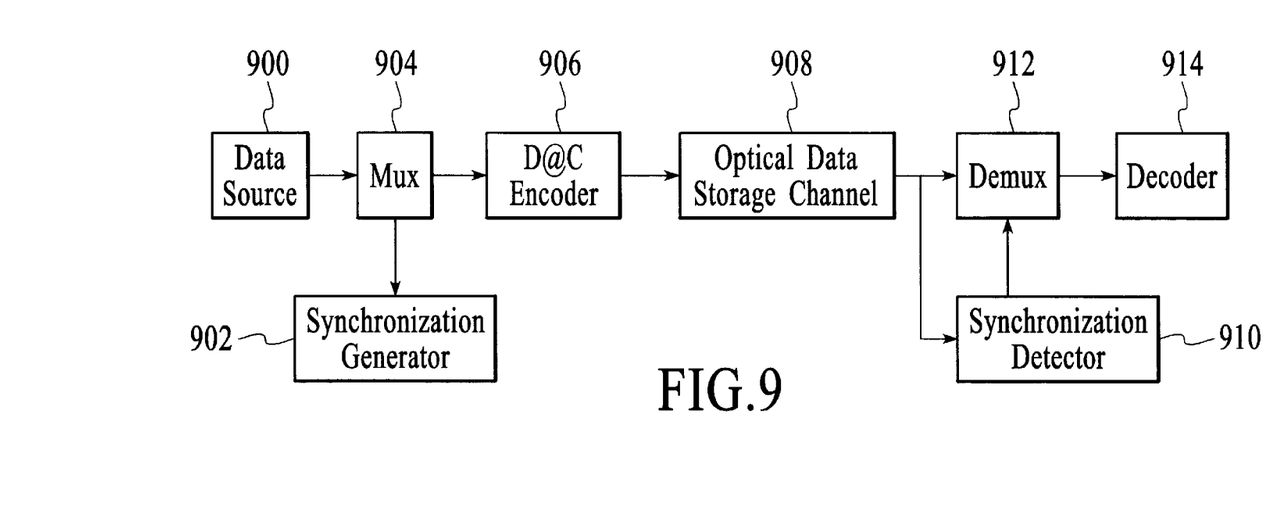
FIG. 9 is a block diagram illustrating a multilevel data storage system with DCC. A data source 900 produces a stream of multilevel data symbols. A synchronization generator 902 produces a synchronization pattern.

In some embodiments, synchronization is provided for systems using DC control (DCC). DCC for a multilevel signal is described in U.S. patent application Ser. No. 09/496,897 entitled "DC Control of a Multilevel Signal," filed Feb. 2, 2000, which is herein incorporated by reference. FIG. 9 is a block diagram illustrating a multilevel data storage system with DCC. A data source 900 produces a stream of multilevel data symbols. A synchronization generator 902 produces a synchronization pattern. A multiplexer 904 inserts the synchronization pattern into the data stream at the start of each sector of data. A DCC encoder 906 divides the multiplexed stream into small blocks and adds merge symbols in front of each block to control the DC and low-frequency content of the resulting multilevel data stream. The DCC-encoded data stream enters the optical data storage channel 908, which represents the combination of writing to and reading from an optical disc, as well as analog processing and sampling of the read signal via an analog-to-digital (A/D) converter. Each multilevel symbol corresponds to a multilevel mark on the disc. A synchronization detector 910 locates the synchronization pattern within the sampled read signal, and a demultiplexer 912 removes samples associated with the synchronization pattern starting at the location that the synchronization detector 910 provides. Finally a decoder 914 decodes the samples to obtain the original data.

For each block of data, the DCC encoder selects a merge symbol from a plurality of candidate merge symbols to merge or insert in front of the block. It uses a criteria based on the running digital sum of the block of data in order to select the best merge symbol. In addition, in order to prevent the synchronization pattern, or patterns, from appearing accidentally within the user data stream, it can prescreen the candidate merge symbols to eliminate any candidate merge symbol that would produce the synchronization pattern somewhere within the user data stream.

The synchronization pattern can be a PN sequence, a pattern that uses invalid symbol pairs from two-dimensional cross-constellations, or any unusual pattern, preferably one composed primarily of the highest and lowest symbols (i.e., symbols 0 and M−1, where M is the number of levels) so as to be easy to detect.

Figure 10:
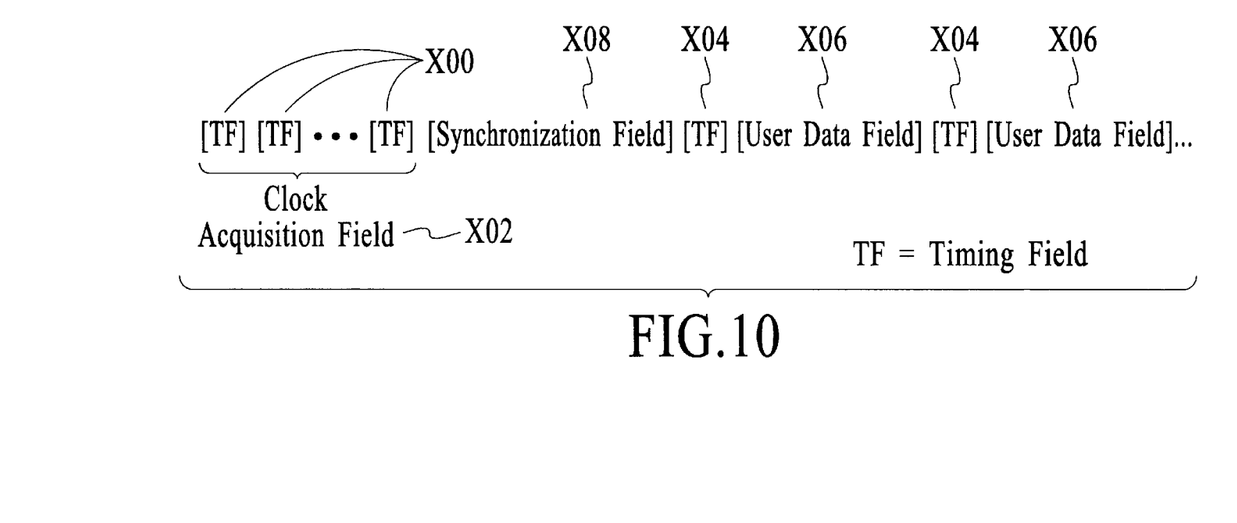
FIG. 10 is a diagram illustrating a data format used in an embodiment where the synchronization pattern marks the location not just of the start of a sector of user data, but also of a change in formatting for timing patterns inserted to achieve timing recovery.

FIG. 10 is a diagram illustrating a data format used in an embodiment where the synchronization pattern marks the location not just of the start of a sector of user data, but also of a change in formatting for timing patterns inserted to achieve timing recovery. The synchronization pattern may be a PN sequence or it may be composed of invalid symbol pairs. The data sector format shown contains periodic timing fields. The timing fields contain timing patterns that provide large high-low and low-high transitions in the read signal, even in the presence of ISI, that a phase-lock loop (PLL) can use to synchronize the read signal clock with the read signal. Initially, the PLL is not locked, that is, it is not synchronized with the read signal, so the A/D converter cannot sample synchronously. In such an embodiment, Timing Fields 1000 are repeated frequently in the Clock Acquisition Field 1002, with no intervening data or other fields, so that the PLL can acquire or lock to the clock very quickly. After the PLL is locked, it only needs to track changes in the read signal clock, so Timing Fields 1004 may appear quite infrequently, interspersed with User Data Fields 1006.

Synchronization Field 1008 marks the transition from a high-frequency clock-acquisition format to a low-frequency clock-tracking format. The synchronization pattern written in the Synchronization Field does not contain large high-low and low-high transitions at locations that the PLL expects, so when the synchronization pattern appears, the series of missed transitions indicate to the PLL that it is time to switch to a low-frequency tracking mode.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of creating a synchronization mark on a multilevel data storage medium comprising:
   generating a pseudo-noise sequence having a plurality of bits;
   converting each 0 bit of the pseudo-noise sequence to the lowest symbol that is
   written to the multilevel data storage medium;
   converting each 1 bit of the pseudo-noise sequence to the highest symbol that is written to the multilevel data storage medium;
   deriving a resulting sequence of symbols from the converted bits; and writing the resulting sequence of symbols to the multilevel data storage medium.

2. A method of creating a synchronization mark on a multilevel data storage medium as recited in claim 1 wherein the pseudo-noise sequence is generated by a maximal-length shift register.

3. A method of creating a synchronization mark on a multilevel data storage medium as recited in claim 1 wherein the multilevel data storage medium is a multilevel optical disk.

4. A method of creating a synchronization mark on a multilevel data storage medium as recited in claim 1 further including selecting surrounding symbols to surround the synchronization mark that sharpen a correlation peak obtained when the synchronization mark and the surrounding symbols are read.

5. A method of creating a synchronization mark on a multilevel data storage medium as recited in claim 1 further including generating a second pseudo-noise sequence and writing a second sequence of symbols derived from the second pseudo-noise sequence to the multilevel data storage medium.

6. A method of creating a synchronization mark on a multilevel data storage medium as recited in claim 1 further including generating a second pseudo-noise sequence and writing a second sequence of symbols derived from the second pseudo-noise sequence to the multilevel data storage medium wherein the second sequence of symbols is separated from the first sequence of symbols by a padding field longer than a typical defect length.

7. A method of creating a synchronization mark on a multilevel data storage medium as recited in claim 1 further including generating a second pseudo-noise sequence and writing a second sequence of symbols derived from the second pseudo-noise sequence to the multilevel data storage medium wherein the second sequence of symbols has a different orientation than the first sequence of symbols so that the two sequences can be distinguished.

8. A method of creating a synchronization mark on a multilevel data storage medium as recited in claim 1 wherein deriving a resulting sequence of symbols from the converted bits includes assigning a repeated symbol to each of the converted bits.

9. A method of creating a synchronization mark on a multilevel data storage medium as recited in claim 1 wherein the synchronization mark indicates the transition from a high-frequency clock-acquisition format to a low-frequency clock-tracking format.

10. A data writing system for writing data to a multilevel data storage medium comprising:
   a pseudo-noise sequence generator for generating a pseudo-noise sequence having a plurality of bits;
   a processor configured to convert each 0 bit of the pseudo-noise sequence to the lowest symbol that is written to the multilevel data storage medium and to convert each 1 bit of the pseudo-noise sequence to the highest symbol that is written to the multilevel data storage medium; and a multiplexer configured to mix the resulting sequence of converted symbols with data from a data source.

11. A multilevel optical storage disc comprising:

multilevel marks that encode data; and synchronization marks determined by:

generating a pseudo-noise sequence having a plurality of bits;

converting each 0 bit of the pseudo-noise sequence to the lowest symbol that is written to the multilevel data storage medium;

converting each 1 bit of the pseudo-noise sequence to the highest symbol that is written to the multilevel data storage medium; and deriving a resulting sequence of symbols from the converted bits.

* * * * *